United States Patent

[11] 3,594,768

| [72] | Inventors | George Allen Harris<br>7764 West Fourteenth Court, Hialeah, Fla.;<br>Alpha M. Wiggins, Apartment 519, El<br>Monte Apartment, Hato Ray, P.R. |
|---|---|---|
| [21] | Appl. No | 609,514 |
| [22] | Filed | Jan. 16, 1967 |
| [45] | Patented | July 20, 1971 |

[54] MOTION DETECTING APPARATUS AND INTRUDER ALARM
8 Claims, 3 Drawing Figs.

[52] U.S. Cl. .................................................. 340/258 A, 340/276
[51] Int. Cl. .................................................. G08b 13/16
[50] Field of Search ........................................ 340/258, 258 B, 256 A, 258 A

[56] References Cited
UNITED STATES PATENTS

| 2,071,933 | 2/1937 | Miessner | 340/258 X |
| 2,655,645 | 10/1953 | Bagno | 340/258 X |
| 2,769,972 | 11/1956 | MacDonald | 340/258 |
| 2,830,204 | 4/1958 | Harris | 340/10 UX |
| 3,100,886 | 8/1963 | Marks | 340/15 |
| 3,260,991 | 7/1966 | Laakmann | 340/15 |
| 3,309,689 | 3/1967 | Keeney | 340/258 |
| 2,749,537 | 6/1956 | Loudon et al. | 340/258 |

Primary Examiner—John W. Caldwell
Assistant Examiner—David L. Trafton
Attorney—Burmeister and Kulie ABSTRACT: A motion detecting device utilizing an ultrasonic radiator and an ultrasonic microphone in which the microphone is electrically connected to an audio detector, and the output of the audio detector is converted into pulses. Pulses having a repetition rate greater than a threshold value are accumulated and utilized to trigger a bistable multivibrator. The output of the multivibrator passes through a time delay device to an alarm, and the unit is provided with an electronic switch for deactuation during the period of time delay.

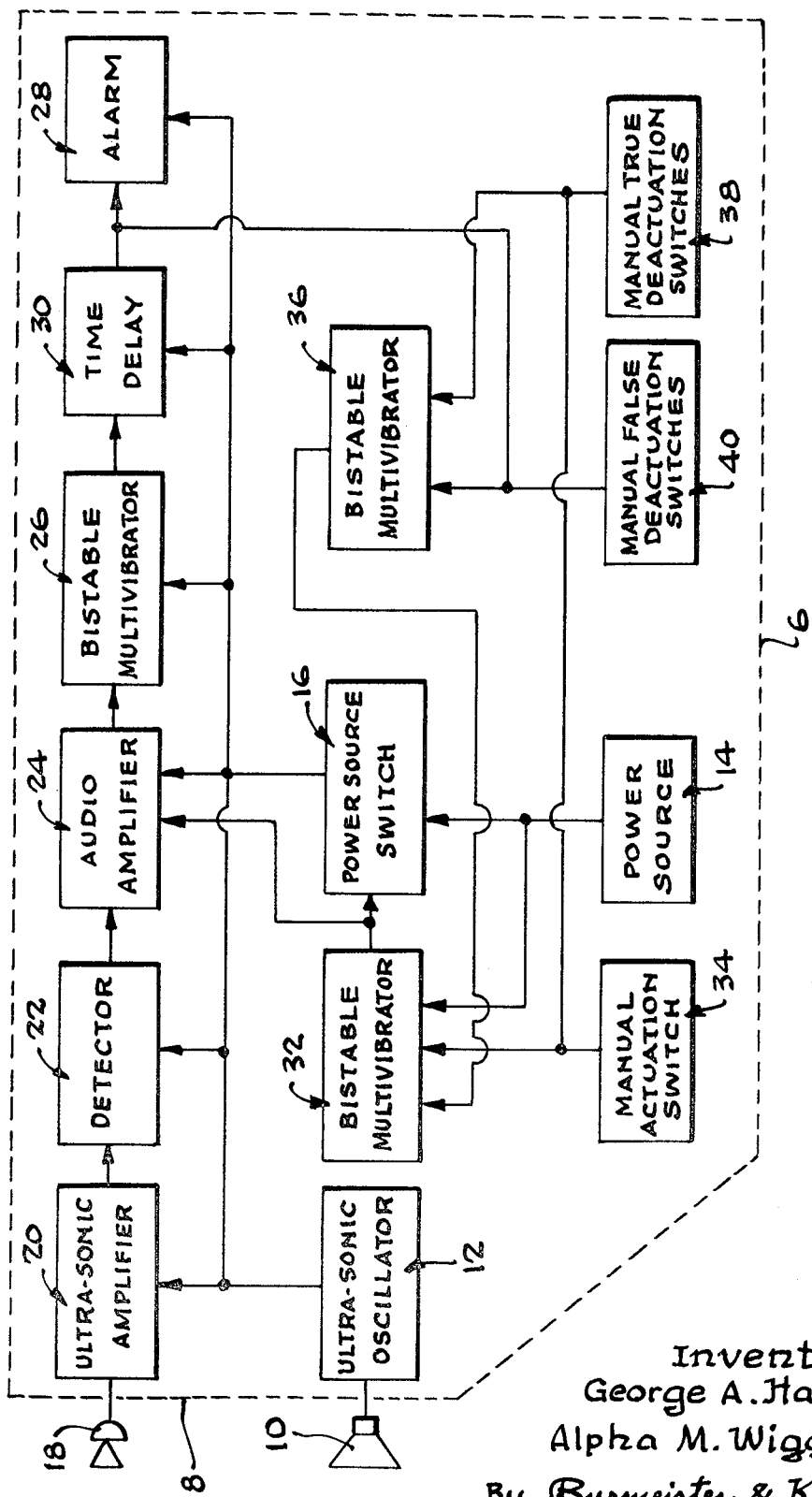

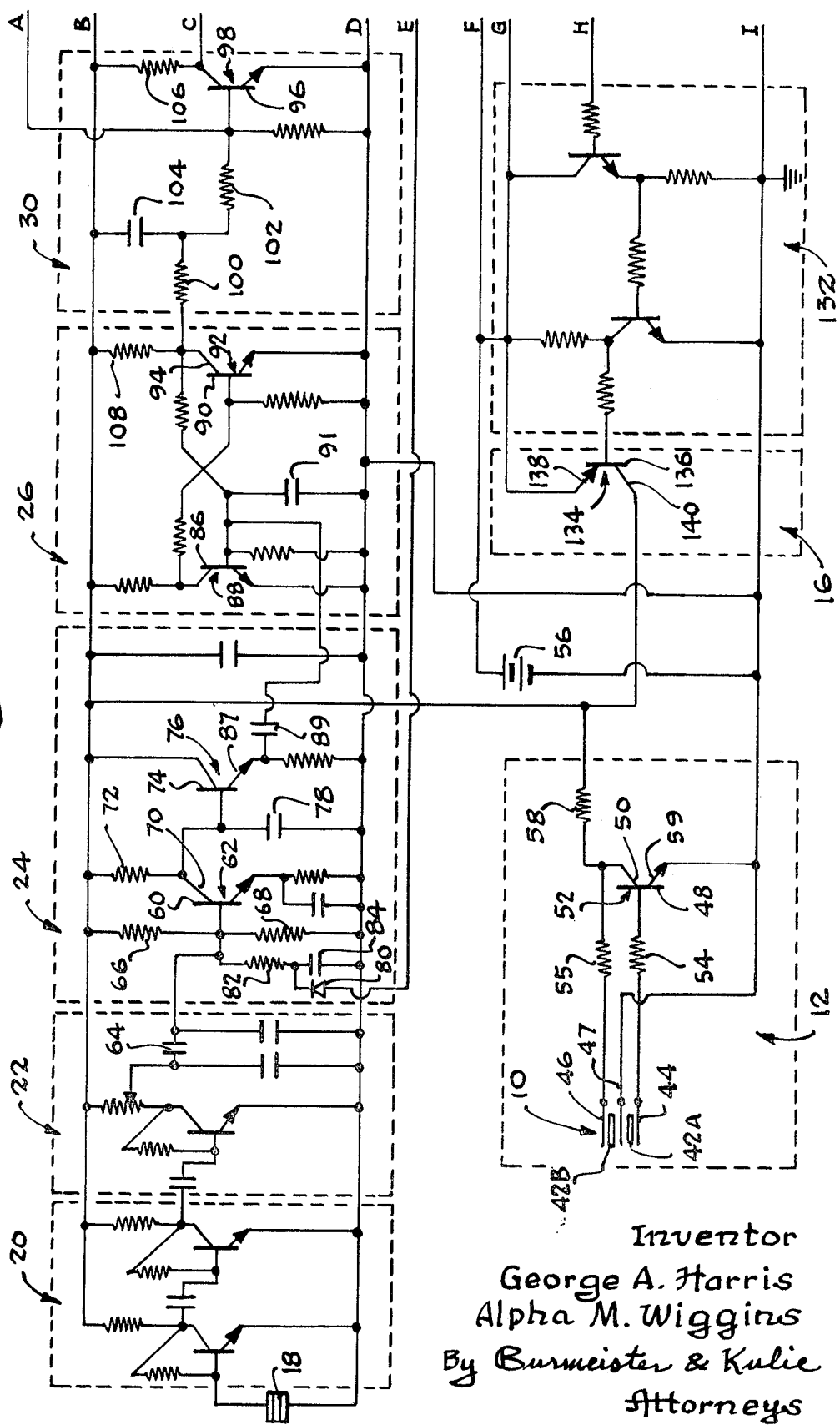

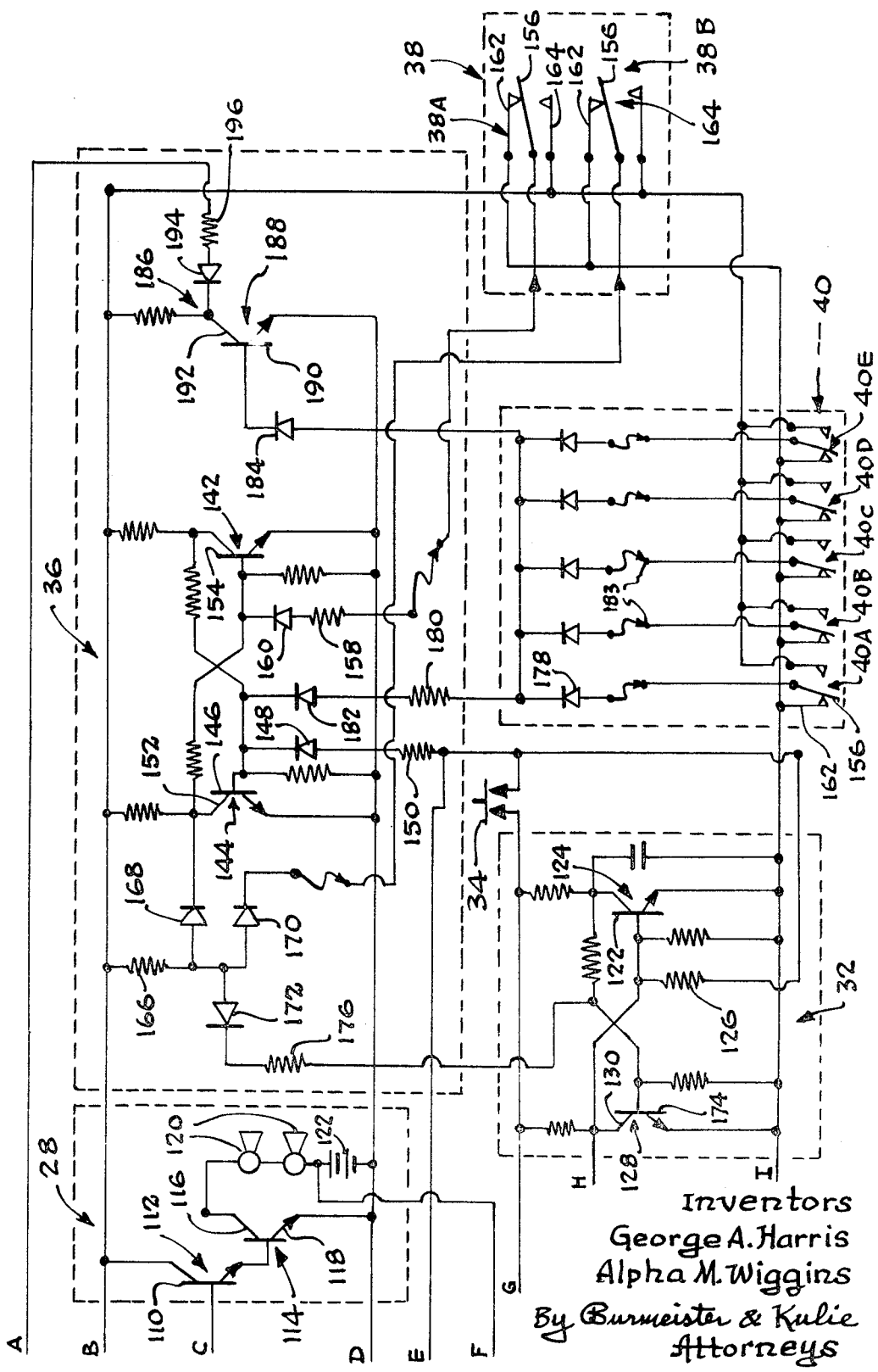

MOTION DETECTING APPARATUS AND INTRUDER ALARM

The present invention relates to devices for detecting motion, and particularly to such devices which are suitable for intruder alarms. In particular, the present invention relates to devices for detecting motion in an enclosure, such as a room.

There have been many devices prior to the present invention for detecting the presence of an intruder. Many well known devices respond to the change of capacity caused by the approach of a person, such as that disclosed in U.S. Pat. No. 3,103,003 of Roberts. Other motion-detecting devices utilize reflections of radio waves, such as that disclosed by Bojko in U.S. Pat. No. 3,210,752 or Summerhayes, Jr. in U.S. Pat. No. 2,660,718, or Lucas Pat. No. 3,189,883. Ultrasonic waves have also been used as a motion detector, as disclosed by Bagno in U.S. Pat. No. 2,903,683.

Prior to the present invention, devices utilizing ultrasonic waves have operated on the Doppler principal and detected small changes in frequency. Such small changes in frequency limit the sensitivity with which an ultrasonic motion detector can be operated with stability and reproducibility. It is therefore an object of the present invention to provide an ultrasonic motion detector with greater sensitivity than such ultrasonic motion-detecting devices heretofore known to the art.

It is also a general object of the present invention to provide an ultrasonic motion-detecting device which is less costly to construct than those heretofore known to the art. In part, this object is achieved by utilizing an amplitude detector in the ultrasonic motion-detecting device constructed according to the present invention, and eliminating from the output of the amplitude detector audio signals having a frequency below a particular value. Both the sensitivity of the motion-detecting device and the low cost thereof are improved by use of an ultrasonic generator which constitutes a part of the present invention.

An ultrasonic motion detector constructed according to the present invention has both an ultrasonic radiator and an ultrasonic microphone, the two units being preferably mounted on a common housing or assembly. When the ultrasonic motion detector is disposed within an enclosure, such as a room, the ultrasonic energy transmitted from the radiator will reflect from the surfaces of the room to provide regions of compression and regions of rarification throughout the entire room. The regions of compression and rarification are generally stable in location, and may be referred to as standing waves. The entrance of an object into the room will result in a new set of reflections, and the movement of the object in the room will cause a continuous movement of the standing wave pattern within the room. As the standing wave pattern changes, the pressure of the ultrasonic waves on the microphone of the ultrasonic motion-detecting unit changes. Since the wavelength of sound in the ultrasonic region is very short, of the order of one-half inch and less, any movement of an object within the enclosure or room is likely to extend through a multiple of wavelengths, thus causing the reflections from this object to change the standing wave patterns of the room at the microphone through a plurality of cycles. For example, an ultrasonic motion detector constructed according to the present invention utilizing a source of ultrasonic waves with a frequency of 20 kilocycles from the microphone within an enclosure will at all times produce an electrical signal with a frequency of 20 kilocycles from the microphone, and if a man enters this room moving at the rate of 3 feet per second, the electrical signals produced by the microphone will receive an additional amplitude modulation of approximately 60 cycles per second. Further, the frequency of the modulation produced by movement in the room may be increased by increasing the frequency of the ultrasonic radiation, hence making the ultrasonic detector more sensitive to small movements. It is therefore a further object of the present invention to provide an ultrasonic motion-detecting device which utilizes an amplitude detector and ultrasonic energy in excess of 25 kilocycles.

While patent No. 3,165,727 to Callahan teaches the desirability of a burglar alarm system with some means providing a time delay commencing on actuation of the burglar alarm in order to permit an authorized person to disarm the burglar alarm, the prior devices known have utilized key-type switches. Such key-type switches have the inherent disadvantages of all key-type switches, namely, the requirement of a key, the possibility of the key falling into the hands of unauthorized persons, and the difficulty in changing the combination of the keylock. It is an object of the present invention to provide a motion-defecting detecting device which is provided with means providing a delay between actuation and alarm and an electrical combination switch which may be utilized during the delay period to disarm the motion-detecting device. It is further an object to provide an improved combination electrical switch which is particularly adapted for use in a burglar alarm.

These and further objects of the present invention will readily become apparent to those skilled in the art from a further consideration of this specification, particularly when viewed in the light of the drawings, in which:

FIG. 1 is a block schematic diagram of a motion-detecting device constructed according to the teachings of the present invention; and FIGS. 2A and 2B together form a schematic electrical circuit diagram of the motion-detecting device set forth in block diagram in FIG. 1.

When a source of ultrasonic radiation is transmitted from a radiator, such as the radiator 10 of FIG. 1, it is transmitted directionally. Almost all loudspeakers possess directional properties, and sound waves of the higher frequencies all travel in straight lines and are reflected from surfaces. A particularly satisfactory electroacoustical transducer for the radiator 10 is that described in patent No. 3,109,111 of Alpha M. Wiggins entitled "Ultra-sonic Microphone," and this transducer emits a beam of acoustical radiation when driven in the ultrasonic frequency range in the form of an expanding cone. This radiation may be directed on a particular surface of an enclosure or room in which motion is to be detected, such as a door or a window, and the radiation will be reflected from this surface to encompass substantially the entire volume of the room and establish adjacent areas of air compression and rarification known as standing waves. As illustrated in FIG. 1, the device has a common housing 6, diagrammatically shown as a dashed line which contains all of the elements of the device. An ultrasonic radiator 10 is mounted on one wall of the housing 6 and is driven by an ultrasonic oscillator 12 at a frequency in the ultrasonic range. It is desirable to utilize the higher frequencies of the ultrasonic range in order to make certain that the sound cannot be detected by the human ear or the ear of an animal. Hence, frequencies above 20 kilocycles should be utilized, and 40 kilocycles has been found to be a particularly desirable frequency range, both for this purpose and because of the fact that the radiation in this range of frequencies reflects efficiently from most hard surfaces of a room, such as a wall or a pane of glass, and has a very short wavelength, thus contributing to the sensitivity of the device. The ultrasonic oscillator 12 is independent of the detection system, except for a common support or housing and for utilizing a common power source 14 and a common power source switch 16.

The ultrasonic energy radiated from the radiator 10 is detected by a microphone 18. A particularly desirable microphone 18 is the microphone disclosed in U.S. Pat. No. 3,109,111 of Alpha M. Wiggins entitled "Ultra-sonic Microphone," the same microphone desirable for use as a radiator. This microphone or radiator 18 is also mounted on the exterior of the wall 8 of the housing 6, and positioned with its directional axes preferably parallel to the directional axis of the radiator 10. The microphone 18 utilizes a piezoelectric element which produces an electrical voltage which is impressed upon the input of an ultrasonic amplifier 20. The amplified electrical signals appearing in the output of the amplifier 20 are impressed upon a detector 22 which is preferably an amplitude detector, and the detector produces an electrical output representing the audiofrequency changes in the ultrasonic signal picked up by the microphone 18. As long as motion does not occur within the confines of the enclosure in which the motion-detecting device is disposed, there will be no substantial audio modulation on the signal picked up by the microphone 18, and hence the detector 22 will produce no output. However, in the event a movement occurs within the enclosure in which the detection device is operating, an audio signal will be produced by the detector, since the motion will be at an audio rate. The audio signal produced by the detector 22 is then amplified in the audio amplifier 24 and utilized to trigger a bistable multivibrator 26. The bistable multivibrator 26 produces a direct current potential level in response to the audio modulation on the signal picked up by the microphone 18, and the direct current potential level of the bistable multivibrator 26 is used to actuation an alarm 28.

The foregoing basic elements of the ultrasonic detection device described in FIG. 1 may be utilized by means of a remote actuating and deactuating system, however, such a remote actuating and deactuating system is undesirable in an intruder alarm since the intruder could deactivate this system before entering the enclosure. For this reason, some means must be provided within the enclosure and in association with the equipment to permit its arming and disarming without actuation of the alarm. For this purpose, a time delay device 30 is connected between the bistable multivibrator 26 and the alarm 28 to permit a person to enter the enclosure and deactuate the detection device before the alarm 28 operates in response to his presence in the enclosure.

The motion detector of FIG. 1 is deactivated by opening the power source switch 16. When the power source switch 16 is opened, power is no longer supplied to the ultrasonic oscillator 12, the ultrasonic amplifier 20, the detector 22, the audio amplifier 24, the bistable multivibrator 26, the alarm 28, or the time delay device 30. However, it is undesirable for the power source switch to be a simple manual switch since someone not familiar with the equipment could readily find such a switch and disarm the motion-detecting device during the period of the time delay. Hence, the power source switch 16 is an electronic switch and it is actuated through an electronic lock. The electronic lock includes a bistable multivibrator 32 which produces an output pulse capable of opening and closing the power source switch 16. The bistable multivibrator is in turn controlled by a manual actuation switch 34 which is utilized to set the equipment in operation initially. The manual actuation switch, however, may not be used to disarm the motion-detecting equipment once the power source switch 16 has been closed. The power source switch 16 must be opened to disarm the motion-detecting device by actuating the bistable multivibrator 32, and this can be achieved through actuation of a bistable multivibrator 36, and the bistable multivibrator 36 may be actuated by closing in proper sequence a plurality of manual true deactuation switches 38. A plurality of manual false deactuation switches 40 are also provided, and actuation of any one of these switches 40 has the effect of immediately actuating the alarm 28. In addition, actuation of any of the false deactuation switches 40 retriggers the bistable multivibrator 32 to prevent opening of the power source switch 16.

The time delay 30 provides approximately 30 seconds after a movement occurs which would result in an amplitude signal from the detector 22 for triggering of the bistable multivibrator 26 and the alarm 28 during which time an operator may actuate in proper sequence the manual true deactuation switches 38, thus removing power from the alarm 28 and preventing the unit from functioning. When the manual actuation switch 34 is closed, thus actuating the power source switch 16, a period of about 30 seconds time delay is also obtained to permit the operator to depart from the enclosure by means of a gating pulse from the actuation switch 34 to the audio amplifier 24. The particular circuits and the manner in which they function are more clearly set forth in FIGS. 2A and 2B of the drawings, the drawings together illustrating a complete motion detector and being interconnected as shown by common reference letters on the two FIGS.

The ultrasonic radiator 10 is illustrated in FIG. 2A and has a pair of members 42A and 42B of piezoelectric material disposed between two spaced electrodes 44 and 46. Further, a third electrode 47 of the ultrasonic transducer is disposed between the members 42A and 42B, and is illustrated at 47, a d is connected to the common ground. The electrodes 44 and 46 are connected to the base 48 and collector 50 of a transistor 52 through resistors 54 and 55, respectively. The collector 50 is connected to the positive terminal of a power source, illustrated as a battery 56 through a resistor 58. Transistor 52 has an emitter 59 which is connected to the common ground.

The ultrasonic transducer itself provides adequate feedback between the collector and base of the transistor 52 in order to cause the circuit to properly oscillate. At the same time, the oscillating piezoelectric member 42 radiates acoustical energy directly into the surrounding atmosphere, and no radiator or other equipment is required.

The microphone 18 has its electrodes connected to the input of the amplifier 20 which is a two stage transistor amplifier, one of the electrodes being connected to the casing and to the common ground. The output of the transistor amplifier 20 is detected in the detector 22, and is impressed upon the base 60 of a transistor 62 employed in the audio amplifier 24 through a capacitor 64. The base 60 is maintained under a positive bias by resistors 66 and 68 which are connected across the power supply 56. The transistor 62 has a collector 70 which is connected to the positive terminal of the power source through a resistor 72 and to the base 74 of a transistor 76 connected in an emitter-follower circuit. A capacitor 78 is connected between the base 74 of transistor 76 and the negative terminal of the power source, or common ground.

When it is desired to place the ultrasonic detection unit of FIGS. 2A and 2B in operation, a push type shorting switch is utilized for the manual actuating switch 34, and closing of the switch 34 connects the positive terminal of the power source 56 to the base 60 of transistor 62 through a diode 80 and a series resistor 82. The diode 80 is connected to pass positive charges to the base 60, and a capacitor 84 is connected between the junction of the diode 80 and the resistor 82 and the common ground. Closing of the switch 34 therefore acts to place a positive charge on the base 60, this positive charge charging capacitor 84 and maintaining the base 60 at a positive potential until the capacitor 84 discharges through resistors 68 and 82. The positive charge on the base 60 of the transistor 62 saturates the transistor 62 and drops the potential on the base 74 of transistor 76 to prevent any pulse from passing through transistor 76 to the bistable multivibrator 26. During the period in which the capacitor 84 is discharging through resistors 68 and 82, the operator may leave the room or enclosure. After capacitor 84 is discharged, modulation on the ultrasonic signal transduced by the microphone 18 will result in a positive pulse being impressed upon the base 86 of one of the transistors 88 of the bistable multivibrator 26. The base 86 of transistor 88 is coupled to the emitter 87 of transistor 76 through a capacitor 89, and a second capacitor 91 is electrically connected between the base 86 and the common ground. The transistor 87 supplies positive direct current pulses to the capacitors 89 and 91 but is cut off during negative-going input pulses and thus does not supply negative output pulses. The base 86 is normally at a lower potential than the base 90 of the other transistor 92 of the bistable multivibrator 26 due to the time required to charge the capacitor 91 when power is initially applied to the bistable multivibrator 24, and therefore audio signals from the audio amplifier 24 flip the bistable multivibrator 26 and cause a positive potential to appear upon the collector 94 of the other transistor 92.

The collector 94 of the transistor 92 is connected to the base 96 of a transistor 98 in the time delay device 30 through two serially connecting resistors 100 and 102. The junction between the resistors 100 and 102 is connected through a capacitor 104 to the positive terminal of the power source 56, and the base 96 of the transistor 98 is connected to the negative terminal of the power source 56 through a resistor 106. The collector 94 of the other transistor 92 is connected to the positive terminal of the power source 56 through a resistor 108, and the capacitor 104 must charge to the potential difference across the resistor 108 through the resistor 100 in order to impress upon the base 96 of the transistor 98 the magnitude of the signal on the collector 94 of the other transistor 92. Hence, a time delay is introduced while the capacitor 104 charges. When the base 96 of transistor 98 falls to approach the potential difference between the collector 94 and the negative terminal of the power source 56, the potential on the base 110 of a transistor 112 of the alarm 28 (illustrated in FIG. 2B) increases to drive a second transistor 114 in the alarm 28 which acts as a transistor switch, and saturates the transistor 114 to permit the flow of current through the collector 116 and emitter 118 of the transistor 114. An alarm, which may be of the horn-type as illustrated by the horns 120, is connected between the positive terminal of the power source 56 and the collector 116 of the transistor 114, and a second power source 122 is also provided to assure adequate current for the horns 120. Hence, once a modulated ultrasonic signal of adequate frequency and duration is transduced by the microphone 18, the horns 120 will sound, even though a time delay occurs due to the requirement of charging capacitor 104, unless the circuit is deactivated.

When the switch 34 is closed, it triggers the bistable multivibrator 32 as a result of placing a positive charge on the base 122 of a transistor 124 through a resistor 126, and hence the transistor 124, is placed in conducting condition. The other transistor 128 of the bistable multivibrator 32 is thus rendered nonconducting, and the collector 130 of transistor 128 becomes positive. The output of the bistable multivibrator 32 appears on the collector 130 of transistor 128 and is amplified through a two transistor amplifier 132 to actuate the transistor switch 16. The switch 16 has a transistor 134 with a base 136 connected to the output of the amplifier 132. The transistor 134 has its emitter 138 connected to the positive terminal of the power source 56 and its collector 140 carries the positive potential to the other elements of the device when the switch 16 is closed.

The ultrasonic motion detector may be disarmed through the operation of the manual true deactuation switches 38 and the bistable multivibrator 36. The bistable multivibrator 36 has two transistors 142 and 144, and the base 146 of the transistor 144 is coupled through a diode 148 and a resistor 150 to the positive terminal of the power source 56 on closing of the switch 34. As a result, the transistor 144 is normally conducting, and the collector 152 of transistor 144 is at a low potential immediately after actuation of the switch 34.

The base 154 of transistor 142 is connected to the pole terminal 156 of the first of the manual true deactivation switches, designated 38A, through a resistor 158 and a diode 160 connected to pass positive charges to the base 154. The switch 38A has two stationary terminals 162 and 164, and the terminal 162 is connected to the negative terminal of the power source 56 while the terminal 164 is connected to the positive terminal of the power source 56. The pole terminal 156 of the switch 38A is normally in contact with the terminal 162, thereby maintaining the base 152 at a low potential and preventing conduction of the transistor 142. When the pole terminal 156 is pivoted into contact with the stationary terminal 164, thereby placing a positive charge on the base 154, transistor 142 becomes conducting, and the bistable multivibrator 36 is flipped. The collector 152 of transistor 144 thereupon assumes a high positive potential. This collector 152 is also connected to the positive terminal of the power source 56 through a resistor 166 and a diode 168 connected to pass positive charges to the collector 152. However, when the transistor 144 is nonconducting, the diode 168 is back biased and the junction between the resistor 166 and the diode 168 may assume approximately the positive potential of the power source 56.

The diode 168 is part of a coincidence circuit, the coincidence circuit including a second diode 170 also connected to pass positive charges from the resistor 166. The diode 170 is connected to the pole terminal 156 of a second manual true deactivation switch 38B, and the two stationary contacts of the switch 38B are connected to the negative and positive terminals of the power source 56, respectively. Hence, when the pole terminal is pivoted from its normal position in contact with the stationary contact 162 into contact with the stationary contact 164, a positive potential is placed on diode 170 to back bias this diode, hence placing a positive pulse upon the junction of the coincidence circuit consisting of diodes 168 and 170 and the resistor 166. Further, a diode 172 is connected between this junction of the diodes 168 and 170 and the base 174 of transistor 128 through a resistor 176.

If the first true deactivation switch 38A is first closed to place transistor 142 in conduction, and thereafter the second true deactuation switch 38B is actuated, a positive pulse will cause the bistable multivibrator 32 to be flipped, thereby reducing the potential of the base 136 of transistor 134 in the power source switch 16 to open the switch 16 and remove the positive potential of the power source 56 from the ultrasonic amplifier 20, detector 22, audio amplifier 24, bistable multivibrator 26, time delay 30, and alarm 28. The two true deactuation switches 38A and 38B are mounted in an assembly with a plurality of false deactivation switches 40, five being illustrated in the particular embodiment set forth in FIGS. 2A and 2B. Each of these false deactivation switches, designated 40A, 40B, 40C, 40D, and 40E, are identical to the true deactuation switches 38A and 38B, and have stationary contacts 162 connected to the negative terminal of the power source 56 and stationary contacts 164 connected to the positive terminal of the power source 56. The pole terminal 156 of each of the false deactivation switches 40 is connected through a diode 178, a resistor 180, and a second diode 182 to the base 146 of transistor 144 of the bistable multivibrator. Since all of the true deactuation switches 38 and false deactuation switches 40 are identical, and in a common assembly, merely interchanging the pole terminal connections of one or both true deactuation switch with the pole terminal connections of a false deactuation switch changes the combination. Plug-in connections 183 have been shown for this purpose, so that a technician may readily change the combination of this electronic switch.

If any one of the false deactivation switches has its pole terminal 156 pivoted into contact with its stationary terminal 164, a positive pulse is placed upon the base 146 of the multivibrator 36 in order to prevent flipping of the bistable multivibrator 32 and removal of the power from the alarm 28. At the same time, each of the diodes 178 is connected through a diode 184 to a transistor switch 186. The transistor switch 186 has a transistor 188 with a base 190 connected to the diode 184, and a collector 192 connected through a diode 194 and a resistor 196 to the base 96 of the transistor 98. The connection of any one of the pole terminals 156 of a false deactivation switch 40 with the stationary contact 164 thereof results in a positive pulse being placed upon the base 190 of the transistor switch 186, thereby closing the switch 186, reducing the potential of the collector 192 thereof, and likewise the potential of the collector 96 of the transistor 98 in order to actuate the alarm 28. Hence, actuation of any one of the false deactivation switches 40 or actuation of the true deactivation switches 38 in other than the correct order will result in immediate actuation of the alarm 28.

It is not necessary to establish standing waves within the enclosure or room in which the motion detection device is to operate, although the most sensitive operation is achieved in this manner. If the room is very large, the ultrasonic generator 12 will not be able to establish regions of compression spaced from regions of rarification throughout the entire enclosure, and the motion detecting device will function only to detect reflections from the transmitted ultrasonic beam. Under conditions in which standing waves are not established, it is desirable that the directional axis of the transmitter 10 and receiver 18 be generally in the same direction, but that these units be spaced to avoid signal blocking. Further, the motion detector can be used out of an enclosure, such as in the open, to detect motion by reflections. It is important that the ultrasonic generator 12 produces a maximum of ultrasonic radiation for the power dissipated, and the ultrasonic generator herein set forth has proven to be a particular efficient source of ultrasonic radiation.

Because of the fact that conditions within an enclosure are constantly changing, the location of the regions of compression and rarification are constantly moving. The temperature of the enclosure affects the propagational rate of sound waves, and changes in temperature cause changes in the standing wave patterns within the enclosure. Also, changes in temperature, or atmospheric pressure, or the like, may affect the reflective properties of the boundaries of the enclosure. For this reason, the microphone 18 is constantly being subjected to small changes in acoustic pressure. If the motion-detecting device is too sensitive, it will respond to changes such as these and sound the alarm, even though no intruder has entered the enclosure. For this reason, a filter utilizing capacitor 91 is incorporated in the multivibrator 26 to prevent the multivibrator 26 from being actuated by frequencies representing inadequate motion to require the sounding of the alarm. The average person will walk at a rate of about 3 feet per second, and hence an alarm should not respond to motions much slower than 1 foot per second. Utilizing ultrasonic energy having a frequency of 40 kilocycles, motion at the rate of 1 foot per second will modulate the ultrasonic rays received by the microphone 18 at the rate of approximately 40 cycles per second. Hence, it is undesirable for signals having a frequency less than 40 cycles per second under these conditions and a substantial duration to trigger the multivibrator 26. The capacitor 91 and the parallel resistor form a means for producing an electrical output responsive to a plurality of direct current pulses having a repetition rate greater than a threshold value. The capacitor 91 requires a plurality of cycles to become charged, and these cycles must occur with a repetition rate not less than of the order of 40 cycles per second in order to charge the capacitor 91. The capacitor 91 is constantly being discharged through the low impedance path between the base and emitter of the transistor 88, thereby providing the time constant which requires an adequate repetition rate and an adequate duration for the charging of capacitor 91.

Those skilled in the art will readily devise many modifications for the present invention, and many applications of the present invention not set forth in this specification. Clearly, other types of alarm circuits may be utilized with the present invention. Also, other types of delay mechanisms, such as that disclosed by Callahan in U.S. Pat. No. 3,165,727 may be utilized with the present invention, but with a sacrifice in flexibility, ease of construction, weight, and cost. It is therefore intended that the scope of the present invention be not limited by the foregoing disclosure, but rather only by the appended claims.

We claim:

1. A motion-detecting device comprising a source of ultrasonic radiation having a frequency above 20 kilocycles, a transducer adapted to generate an electrical signal responsive to the ultrasonic radiation from said source, an amplitude detector having an input electrically connected to the transducer and an output for conducting the audiofrequency component of the electrical signals generated by the transducer to the output of said detector and isolating the output from the ultrasonic frequency component of the electrical signals generated by the transducer, and means connected to the output of said detector for producing an electrical output responsive to audio signals having a repetition rate greater than a threshold value, said means preventing production of said electrical output responsive to audio signals having a frequency lower than the threshold value, said means including an electronic switch having an input circuit, said electronic switch being operable by a predetermined actuation potential across said input circuit, a filter including a capacitor connected across said input circuit, and means for converting said audio signals from said detector into direct current pulses supplied to said capacitor and said input circuit, a plurality of said pulses being effective to charge said capacitor to build up a potential across said input circuit exceeding said actuation potential so as to operate said electronic switch in response to pulses having a frequency greater than said threshold value, said input circuit of said electronic switch including a low impedance element across said capacitor to discharge said capacitor and thereby limit the potential across said input circuit to a value less than said actuation potential for pulses having a frequency less than said threshold value.

2. A motion-detecting device for use in an enclosure comprising the combination of claim 1 wherein said filter and said input circuit are constructed and arranged to establish said threshold frequency at substantially one-thousandth of the frequency of the ultrasonic source of radiation.

3. A motion-detecting device for use in an enclosure comprising the combination of claim 1 wherein the frequency of the ultrasonic source is of the order of 40 kilocycles per second, and the threshold frequency is of the order of 40 cycles per second.

4. A motion-detecting device for use in an enclosure comprising the combination of claim 1 wherein the electronic switch comprises a bistable flip-flop.

5. A motion detector comprising the combination of claim 1 in combination with a second capacitor connected to said first mentioned capacitor to supply the direct current pulses thereto, said second capacitor being larger than the first capacitor.

6. A motion-detecting device comprising the combination of claim 1 wherein the source of ultrasonic radiation comprises an oscillator having a transistor with a base, a collector and an emitter, a source of direct current potential connected between the collector and the emitter, and a transducer having a pair of piezoelectric elements adapted to oscillate at the same frequency in the ultrasonic range, said transducer including tow electrodes abutting each piezoelectric element, one of the electrodes abutting each element being electrically interconnected and connected to one terminal of the power source, one of the other electrodes being electrically connected to the collector of the transistor and the other of the other electrodes being electrically connected to the base of the transistor.

7. A motion detector comprising a source of ultrasonic radiation having a frequency above 20 kilocycles, a transducer adapted to generate an electrical signal responsive to the ultrasonic radiation from said source, an amplitude detector having an input electrically connected to the transducer and an output, first electrically operable switching means, and a filter electrically connected between the first switching means and the output of the amplitude detecto for isolating low frequencies from the first switching means and preventing actuation thereof responsive to said low frequencies, in combination with an alarm circuit, an electrical delay means electrically connected between the first switching means and said alarm circuit, and means electrically coupled to the first switching means to prevent actuation thereof including a pair of single-pole double-throw true deactuation switches and a plurality of identical single-pole double-throw false deactuation switches mounted adjacent to each other, each of these switches having a pole contact normally butting one stationary contact and said one stationary contact of each switch being connected to one terminal of a power source, the other stationary contact of each switch being connected to the other terminal of the power source, a bistable flip-flop having a first stage with a first input and a second stage with a second input, the first and second stages having first and second output circuits, respectively, and one of said output circuits being at a higher potential than the other, the pole contact of one of the true deactuation switches being connected to the first input of the flip-flop, the potential of the power source on the second stationary contact being adapted to flip the flip-flop and the second stage being normally conducting, the pole contact of each of the false deactuation switches being electrically connected to the second input terminal of the flip-flop, a coincidence circuit having a resistor and three diodes connected in a common junction, the other terminal of the resistor being connected to the other terminal of the power source, the other terminal of one of the diodes being connected to the output circuit of the second stage of the flip-flop, the other terminal of another diode being electrically connected to the pole contact of the other true deactuation switch, and second electrically operable switching means having an actuation terminal and a pair of switch terminals electrically connected to the first electrically operable switching means to prevent closing of said second switching means, the other terminal of the third diode being electrically connected to the input terminal of the second switching means to actuate said second switching means responsive to the coincidence of back bias on the first and second diodes of said coincidence circuit.

8. A motion detector comprising the combination of claim 7 in combination with third electrically operable switching means having an input terminal and an output terminal connected to said alarm circuit, the input terminal of the third switching means being electrically coupled to the pole contacts of all of the false deactuation switches.